Nov. 13, 1928.

A. E. WINCKLER 1,691,173

COMBUSTION CHAMBER FOR INTERNAL COMBUSTION ENGINES

Filed March 26, 1925  2 Sheets-Sheet 1

Patented Nov. 13, 1928.

1,691,173

UNITED STATES PATENT OFFICE.

AAGE E. WINCKLER, OF MILWAUKEE, WISCONSIN.

COMBUSTION CHAMBER FOR INTERNAL-COMBUSTION ENGINES.

Application filed March 26, 1925. Serial No. 18,382.

The invention relates to internal combustion engines and more particularly to the combustion chambers thereof.

The object of the invention is to provide an improved combustion chamber which will produce thorough and even intermingling of the injected vapor from the fuel injector and the air compressed by the piston in the working cylinder. A further object of the invention is to provide an improved combustion chamber which is adapted for use with an engine of the sleeve-valve type.

The invention consists in the several novel features hereinafter set forth and more particularly defined by the claims at the conclusion hereof.

Figure 1:
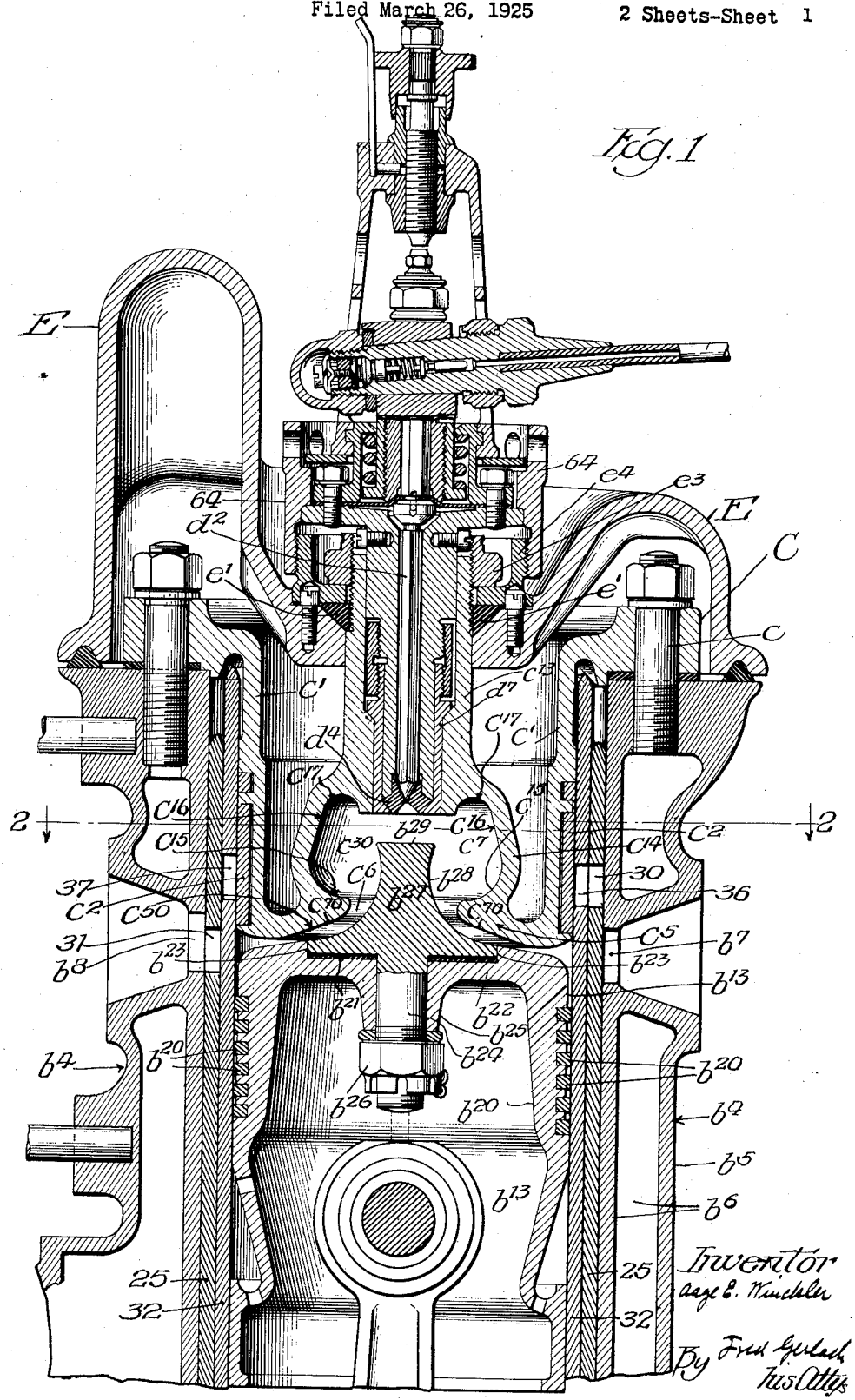
Figure 2:
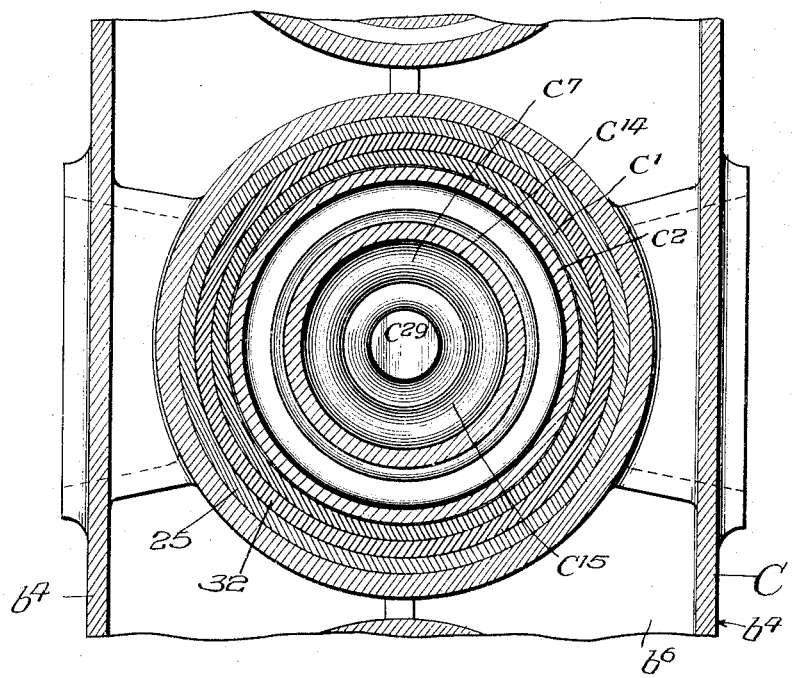
Figure 3:
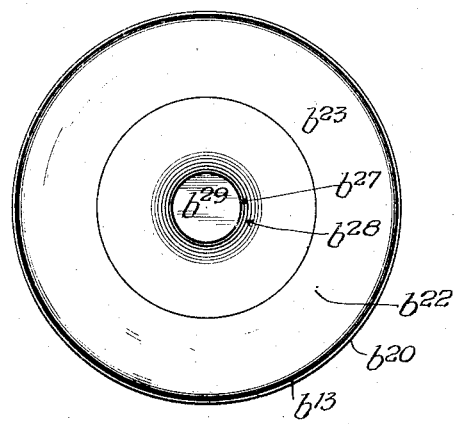
Figure 4:
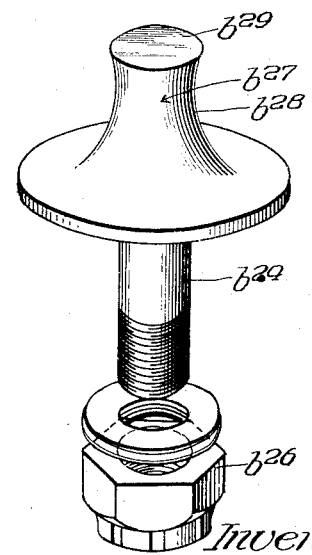

In the drawings: Fig. 1 is a longitudinal section of an internal combustion engine embodying the invention. Fig. 2 is a section taken on line 2—2 of Fig. 1. Fig. 3 is a plan view of the pistons. Fig. 4 is a detail perspective of the removable piston tip which is adapted to enter the combustion chamber.

The invention is exemplified in an engine of the fuel injection type and comprises a cylinder $b^4$ provided with an outer wall $b^5$ to form a water-jacket $b^6$ around the cylinder and a cylinder-head C which is secured to the cylinder casting by bolts $c$. Head C comprises an annular or cylindrical wall $c'$ which extends longitudinally into the working cylinder $b^4$ and an inner end $c^5$ which is curved at its outer margin and slopes inwardly and upwardly, as at $c^{50}$, to a circular opening $c^6$. A combustion-chamber $c^7$ is formed in a wall $c^{14}$ which is integral with the end $c^5$ and a cylindrical portion $c^{13}$ which is integrally formed with wall $c^{14}$ and is adapted to contain a fuel injector D. The combustion or firing chamber is circular in cross-sectional contour and is concavely curved, as at $c^{15}$, upwardly and outwardly from the inner margin of the end wall $c^5$ and is thence tapered or conoidal, as at $c^{16}$, to its upper end which is concavely curved, as at $c^{17}$, to the plane of the inner end of the fuel injector casing $d$.

The engine is of the four cycle sleeve valve type and comprises an outer cylindrical sleeve valve 25 which fits in the working cylinder $b^4$ and an inner cylindrical sleeve-valve 32, working between sleeve 25 and the wall $c'$ of the cylinder-head C. These sleeve valves are operated from the engine shaft to control the admission of air to the cylinder and the exhaust of the products of combustion therefrom in accordance with the principle of a four-cycle internal combustion engine. Sleeve 25 is provided with a port 30 adapted to register with the air intake port $b^7$ in the cylinder $b^4$ and with a port 31 adapted to register with the exhaust port $b^8$. Sleeve 32 is provided with an air inlet port 36 which is adapted to register with ports 30 and $b^7$ to admit air into the cylinder every fourth cycle. Sleeve 32 is also provided with a port 37, which, during every fourth cycle of the piston, is adapted to register with the exhaust port 31 in the sleeve 25 and with an exhaust port $b^8$ in the cylinder. Packing rings $c^2$ are provided in the wall $c'$ of the cylinder-head C to prevent the escape of fluid between the sleeve-valve 32 and the wall $c'$. These sleeve valves are operated from the crank-shaft of the engine, usually by eccentrics or cams (not shown) which control and time their movements to properly control the admission of air and the exhaust of the products of combustion.

A working piston, connected to the crank shaft of the engine by means of the usual pitmen (not shown), is mounted to slide in the sleeve valve 32. The working piston comprises an annular wall $b^{13}$ slidable in the sleeve-valve 32 and provided with packing rings $b^{20}$ and an end wall $b^{21}$. A recess $b^{22}$ is formed in the inner end of piston-wall $b^{21}$ and the base $b^{23}$ of a tip adapted to enter the combustion chamber is held in said recess. The tip is provided with a stem $b^{24}$ which extends through a boss $b^{25}$ and is secured to the piston by a nut $b^{26}$ threaded to the outer end of said stem. The tip $b^{27}$ is circular in cross-section and is concavely curved, as at $b^{28}$, from the base to its inner end $b^{29}$. The inner end of the tip is adapted to enter the combustion chamber $c^7$. The concave curve of the tip from the base inward conforms approximately to the contour of the inner face portion $c^{70}$ of the end $c^5$ of the cylinder head, so that the air compressed in the working cylinder will be deflected inwardly therebetween and past the margin of the opening $c^6$. When in the combustion chamber, the upper portion of the tip is curved to deflect the air upwardly and radially outward or towards the upper end of the margin of the combustion chamber.

The fuel injector D illustrated is of the construction shown in an application filed by me of even date herewith, serially numbered 18,381, to which reference may be had for a detailed description thereof. The valve $d^2$ of the injector has a pointed or needle end seating in a removable nozzle $d^4$. The needle and nozzle are adapted to vaporize a predetermined volume of liquid fuel forced to the valve-seat and to spread the vapor downwardly and radially outward around the piston tip $b^{27}$. The engine is adapted to ignite the fuel by compression.

The cylinder-head C is water-cooled and is in communication with the water circulating in the water jacket $b^6$. The top closure for the water jacket in the cylinder-head C is formed by a head E, which is fitted to the margin of the cylinder casting. A gasket $e'$, held in a marginal groove in the head E, is clamped downwardly by said head and against the top of the cylinder casting by a collar $e^3$ which is screw-threaded to the upper end of the cylindrical extension $c^{13}$ and engages a ring $e^4$. The latter is adapted to compress a gasket $e'$ around extension $c^{13}$ to form a fluid tight joint between the head and said extension. The injector is removably coupled to a ring $e^4$ by a coupling ring 64. The injector is connected to suitable pumping mechanism by which accurately measured charges of liquid fuel will be injected at the desired pressure into the combustion chamber under control of the injection valve $d^2$.

In operation, a charge of liquid fuel will be injected under high pressure, and momentarily while the crankshaft is travelling near its upper dead center, at which time the piston tip is disposed in the combustion chamber, the injector will direct a spray of vaporized fuel downwardly and outwardly towards the lower portion of the curved portion $c^{15}$ of the combustion chamber and the air undergoing compression, which is in rapid whirling motion imparted to it by being forced inwardly and against the curved portion $b^{28}$ of the piston tip and by this upwardly and outwardly against the curved upper portion $c^{17}$ of the combustion chamber and by this downwardly and outwardly against the conoidal portion $c^{16}$ to curved portion $c^{15}$, will pick up and envelop the finely divided fuel particles and carry them around with it, thereby greatly aiding the complete vaporization of the fuel and providing a homogeneous mixture. Air will be admitted into the cylinder during the suction stroke of the piston and compressed during the upward stroke of the piston, so that when the piston reaches the end of its upstroke and the crank is on the dead center, the air will be highly compressed and directed between the piston and its tip and the lower end of the cylinder-head C into the combustion chamber $c^7$. When the injection occurs, the air and vapor will be thoroughly intermixed to produce the combustible fluid which will ignite and impart the power stroke to the piston. While the piston tip is in the combustion chamber, it cooperates with the wall around it as previously described, so as to thoroughly mix the fuel and air.

The invention exemplifies an internal combustion engine with an improved combustion chamber, in which a tip on the piston enters the chamber and aids in giving directional flow to the compressed air for aiding in effecting a thoroughly mixed combustible fluid; also one which is adapted for use in a sleeve valve type of motor.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In an internal combustion engine, the combination of a cylinder, a reciprocating piston therein, a cylinder head provided with a combustion chamber coaxial with the cylinder, an injector connected to the upper end of the head and positioned to spray fuel into the combustion chamber, said head having a wall at its lower end with an opening therein between the cylinder and said chamber, the chamber having a greater diameter than the opening, and a circular tip on the end of the piston, having a base portion disposed adjacent said wall and a top portion smaller in diameter than said opening and adapted to extend into the combustion chamber so that the fuel and air will be mixed in the chamber between the side wall thereof and the tip, the upper end of the top portion of the tip being flared outwardly so as to direct the air from the base portion upwardly and outwardly toward the upper and outer portion of the combustion chamber.

2. In an internal combustion engine, the combination of a cylinder, a reciprocating piston therein, a cylinder head provided with a combustion chamber coaxial with the cylinder, an injector connected to the upper end of the head and positioned to spray fuel into the combustion chamber, said head having a wall at its lower end with an opening therein between the cylinder and said chamber, the chamber having a greater diameter than the opening, and a circular tip on the end of the piston having a base portion, the periphery of which is curved concavely, and a top portion smaller in diameter than said opening and adapted to extend into the combustion chamber so that the fuel and air will be mixed in the chamber between the side wall thereof and the tip, the upper end of the top portion of the tip being flared outwardly so as to direct the air from the concavely curved periphery of the base portion upwardly and outwardly toward the upper and outer portion of the combustion chamber.

3. In an internal combustion engine, the combination of a cylinder, a reciprocating piston therein, a cylinder head provided with a combustion chamber coaxial with the cylinder, an injector connected to the upper end of the head and positioned to spray fuel into the combustion chamber, said head having a wall at its lower end with an opening therein between the cylinder and said chamber, the chamber having a greater diameter than said opening, the lower surface of said wall being conoidal in shape and leading to said opening, and a circular tip on the end of the piston having a base portion adjacent the conoidal surface, and a columnar tip portions smaller in diameter than said opening and adapted to extend into the combustion chamber so that the fuel and air will be mixed in the chamber between the side wall thereof and the tip, the periphery of the base portion being curved concavely and so that the distance between the base portion and the conoidal surface is greatest at their inner margins.

4. In an internal combustion engine, the combination of a cylinder, a reciprocating piston therein, a cylinder head provided with a combustion chamber coaxial with the cylinder, an injector connected to the upper end of the head and positioned to spray fuel into the combustion chamber, said head having a wall at its lower end with an opening therein between the cylinder and said chamber, the chamber having a greater diameter than said opening, the wall of the head forming said combustion chamber being shaped so that the latter has a concave peripheral portion at the end adjoining the opening, a comparatively large central portion tapering from the lower part thereof to the upper part, and an annular concave upper portion, the curve of said upper portion being sharper than the curve of the portion adjoining the opening, and a tip on the end of the piston smaller in diameter than the opening and adapted to extend in the combustion chamber so that the fuel and air will be mixed in the chamber between the tip and the chamber-forming wall.

Signed at Chicago, Illinois, this 24th day of March, 1925.

AAGE E. WINCKLER.